United States Patent [19]
Tremblay et al.

[11] Patent Number: 6,138,210
[45] Date of Patent: *Oct. 24, 2000

[54] MULTI-STACK MEMORY ARCHITECTURE

[75] Inventors: Marc Tremblay, Palo Alto; James Michael O'Connor, Union City, both of Calif.

[73] Assignee: Sun Microsystems, Inc., Palo Alto, Calif.

[ * ] Notice: This patent is subject to a terminal disclaimer.

[21] Appl. No.: 08/880,336

[22] Filed: Jun. 23, 1997

[51] Int. Cl.[7] ...................................................... G06F 12/08

[52] U.S. Cl. ........................... 711/132; 711/120; 711/170

[58] Field of Search .................................... 395/678, 684; 711/132, 119, 120, 109, 110, 170, 173; 709/108, 304

[56] References Cited

U.S. PATENT DOCUMENTS

| | | | |
|---|---|---|---|
| 3,810,117 | 5/1974 | Healey | 340/172.5 |
| 3,878,513 | 4/1975 | Werner | 340/172.5 |
| 3,889,243 | 6/1975 | Drimak | 340/172.5 |
| 3,924,245 | 12/1975 | Eaton et al. | 711/219 |
| 4,268,903 | 5/1981 | Miki et al. | 364/200 |
| 4,354,232 | 10/1982 | Ryan | 364/200 |
| 4,375,678 | 3/1983 | Krebs, Jr. | 365/238 |
| 4,524,416 | 6/1985 | Stanley et al. | 364/200 |
| 4,530,049 | 7/1985 | Zee | 364/200 |
| 4,600,986 | 7/1986 | Sheuneman et al. | 364/200 |
| 4,674,032 | 6/1987 | Michaelson | 364/200 |
| 4,761,733 | 8/1988 | McCrocklin et al. | 711/212 |
| 4,811,208 | 3/1989 | Myers et al. | 711/132 |
| 4,951,194 | 8/1990 | Bradley et al. | 364/300 |
| 5,043,870 | 8/1991 | Ditzel et al. | 364/200 |
| 5,093,777 | 3/1992 | Ryan | 395/400 |
| 5,107,457 | 4/1992 | Hayes et al. | 395/800 |
| 5,142,635 | 8/1992 | Saini | 395/375 |
| 5,157,777 | 10/1992 | Lai et al. | 395/425 |
| 5,210,874 | 5/1993 | Karger | 395/684 |
| 5,485,572 | 1/1996 | Overly | 395/182.19 |
| 5,535,350 | 7/1996 | Maemura | 395/403 |
| 5,603,006 | 2/1997 | Satake et al. | 395/459 |
| 5,634,027 | 5/1997 | Saito | 395/403 |
| 5,636,362 | 6/1997 | Stone et al. | 395/456 |
| 5,687,336 | 11/1997 | Shen et al. | 395/378 |
| 5,784,553 | 7/1998 | Kolawa et al. | 395/183.14 |

OTHER PUBLICATIONS

Microsoft Press Computer Dictionary, 2nd Ed., p. 279, 1994.
Electronic Engineering, vol. 61, No. 750, Jun. 1989, p. 79, XP000033120, "Up Pops A 32Bit Stack Microprocessor."
Atkinson, R.R., et al., "The Dragon Processor", Second International Conference on Architectural Support for Programming Languages and Operating Systems, No. 1987, Oct 5, 1987, pp. 65–69, XP000042867.
Stanley, et al., "A Performance Analysis of Automatically Managed Top of Stack Buffers", 14th Annual International Symposium on Computer Architecture, Jun. 2, 1987, pp. 272–281, XP002032257.
Burnley, P: "CPU Architecture for Realtime VME Systems", Microprocessors and Microsystems, London, GB, vol. 12, No. 3; Apr. 1988; pp. 153–158; XP000002633.
Lopriore, L: "Line Fetch/Prefetch in a Stack Cache Memory", Microprocessors and Microsystems, vol. 17, No. 9, Nov. 1, 1993, pp. 547–555, XP00413173.

*Primary Examiner*—Do Hyun Yoo
*Assistant Examiner*—Gary J. Portka
*Attorney, Agent, or Firm*—Gunnison, McKay & Hodgson, LLP; Forrest Gunnison

[57] ABSTRACT

The present invention provides a unique multi stack memory system to provide access to multiple portions of the method frames of a stack based computing system. In one embodiment of the invention, a multi-stack memory system includes a first stack configured to store a first frame component of a first method frame and a second frame component of a second method frame. A second stack is configured to store a second frame component of the first method frame and a first frame component of second method frame. The first frame component of the method frames can be for example an operand stack. The second frame components of the method frames can be, for example, arguments and local variable areas.

7 Claims, 9 Drawing Sheets

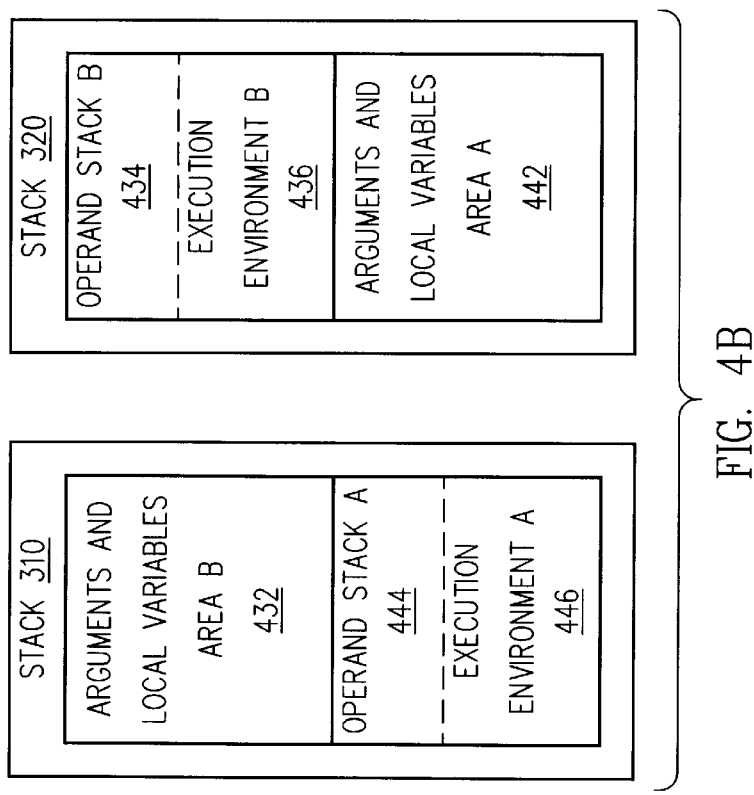
FIG. 4B
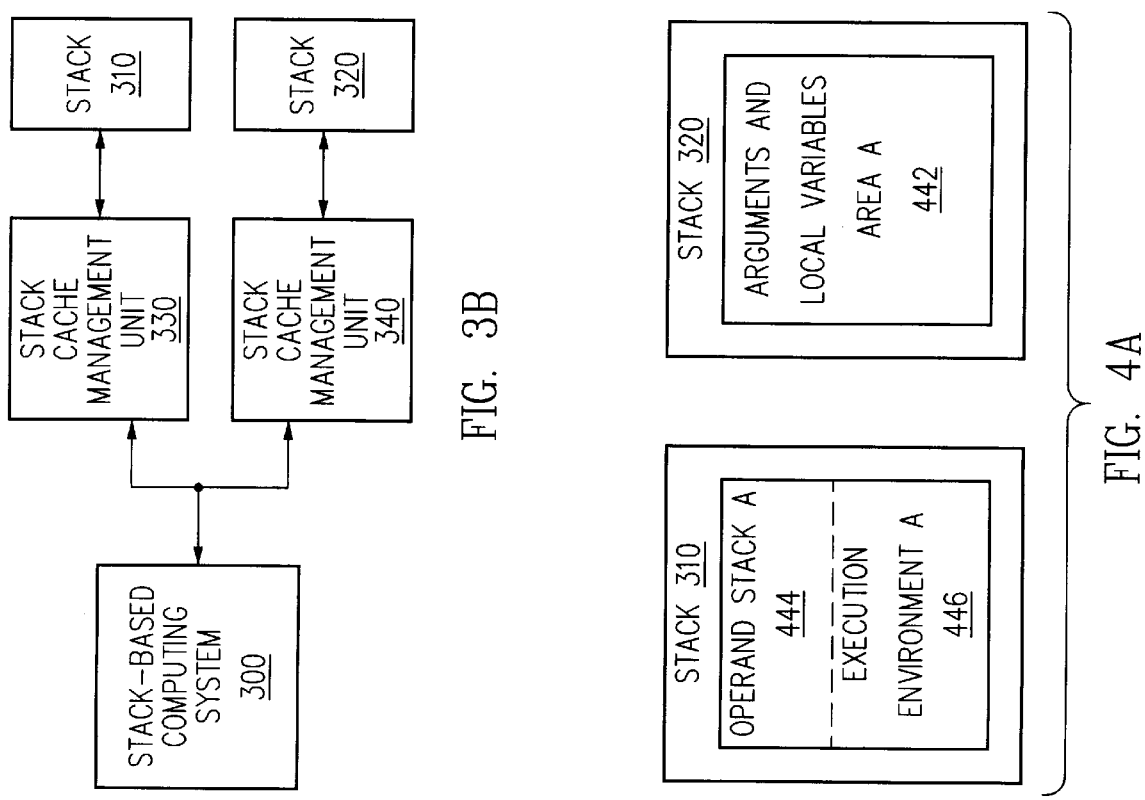
FIG. 3B
FIG. 4A

MULTI-STACK MEMORY ARCHITECTURE

CROSS-REFERENCE TO RELATED APPLICATIONS

This application relates to the co-pending application Ser. No. 08/880,934, filed Jun. 23, 1997, METHOD FOR STORING METHOD FRAMES IN MULTIPLE STACKS", by Tremblay et al., owned by the assignee of this application and incorporated herein by reference.

This application relates to the co-pending application Ser. No. 08/880,466, filed Jun. 23, 1997, METHOD FOR STACK-CACHING METHOD FRAMES", by Tremblay et al., owned by the assignee of this application and incorporated herein by reference.

This application relates to the co-pending application Ser. No. 08/880,633, filed Jun. 23, 1997, entitled MULTI-STACK-CACHING MEMORY ARCHITECTURE", by Tremblay et al., owned by the assignee of this application and incorporated herein by reference.

BACKGROUND OF THE INVENTION

1. Field of the Invention

The present invention relates generally to computer systems and, in particular, to stack-based memory architectures.

2. Discussion of Related Art

A typical computing system includes a processing unit and a memory unit. Most computing systems use a random access memory architecture for the memory unit. However, some computing systems use a stack architecture for the memory unit. For example, FIG. 1 shows a stack-based computing system 100 coupled to a stack 110. A classical stack memory unit uses a last in first out access model. Conceptually, new data entering a stack memory unit is placed on top of the existing data, i.e., in the next available memory location. If data is requested from the stack, the last piece of data "on top of" the stack is retrieved first. For certain applications, stack-based memory architectures provide several advantages over random access memory architectures. For example, a stack memory architecture is well suited for a calculator using RPN notation.

Stack 110 of stack-based computing system 100 is primarily used as a repository of information for methods, e.g., subroutines or threads. At any point in time, stack-based computing system 100 is executing a single method, i.e. the current method. Each method has memory space, i.e., a method frame on stack 110. Stack-based computing system 100 allocates a new method frame, e.g., method frame D 210, upon a method invocation. The new method becomes the current method frame, i.e., the method frame of the current method. Current method frame D 210, as well as the other method frames, may contain various frame components such as object references, incoming arguments, local variables, the invoker's method context, an operand stack, and a return value from the method. The specific frame components in a particular method frame depend on various method invoking situations.

In FIG. 2, object reference, incoming arguments, and local variables are included in arguments and local variables area 211. The invoker's method context is included in execution environment 222, sometimes called frame state, that in turn may include: a return program counter value that is the address of the virtual machine instruction, e.g., JAVA opcode, next to the method invoke instruction; a return frame that is the location of the calling method's frame; a return constant pool pointer that is a pointer to the calling method's constant pool table; a current method vector that is the base address of the current method's vector table; and a current monitor address that is the address of the current method's monitor. Although FIG. 2 depicts each method frame separately, some embodiments of stack-based computing system 100 use overlapping method frames. For example, if method D embodied by method frame D 210 was invoked by method C embodied by method frame C 220, method C would place many of the arguments and local variables for method D on the operand stack of method frame C. Therefore, in some embodiments of stack 110, a portion of the operand stack of one method is also a portion of the arguments and local variables area of another method frame.

The performance of some stack-based computing systems, such as the JAVA virtual machine, improves if the stack-based memory system supports data access to other portions of the stack in addition to the top of the stack. For example, in executing method D variables from arguments and local variables area 211 may often be required. One method to provide access to portions of the stack other than the top of the stack is to use a multi-ported stack cache. For example, a stack cache can be used to store a top portion of the stack. The stack cache then provides standard pushing and popping at the top of the stack as well as an input/output port to access other data in the stack cache. An implementation of a stack cache is described in U.S. patent application Ser. No. 08/787,736, entitled "METHODS AND APPARATUSES FOR STACK CACHING" naming Marc Tremblay and James Michael O'Connor as inventors, assigned to the assignee of this application, and filed on Jan. 23, 1997, which is incorporated herein by reference in its entirety. Further details of a pipelined stack cache is described in U.S. patent application Ser. No. 08/829,105, entitled "PIPELINED STACK CACHING METHOD" naming Sailendra Koppala as inventor, assigned to the assignee of this application, and filed on Mar. 31, 1997, which is incorporated herein by reference in its entirety.

However, a stack cache has a limited number of memory locations. As programs for stack-based computing systems evolve, methods on stack-based computing systems are becoming more complex. For example, application programs such as word processors are being adapted to the JAVA virtual machine, which is a stack-based computing system. These complex methods may use an operand stack greater than the capacity of the stack cache. Therefore, the arguments and local variables area of the current method frame may not be available in the stack cache. Hence, there is a need for a memory architecture providing benefits of a stack with the ability to provide easy access to multiple locations in the memory architecture.

SUMMARY

Accordingly, the present invention provides a unique multi stack memory system to provide access to multiple portions of the method frames of a stack based computing system. In one embodiment of the invention, a multi-stack memory system includes a first stack configured to store a first frame component of a first method frame and a second frame component of a second method frame. A second stack is configured to store a second frame component of the first method frame and a first frame component of second method frame. The first frame component of the method frames can be for example an operand stack. The second frame components of the method frames can be, for example, arguments and local variable areas.

Because the first frame component and second frame component of each method frame are stored in separate stacks, no matter how large the first frame component, e.g., an operand stack, of a method frame grows, the second frame components, e.g., an arguments and local variables area, of the method frame remains at the top of a stack for easy access by the stack-based computing system.

Some embodiments of the memory architecture includes a stack cache management unit coupled to the first stack to improve performance of the first stack. Similarly, other embodiments also include a second stack cache management unit coupled to the second stack. Furthermore, another embodiment of the invention, uses three stacks to store three different frame components of a method frame.

BRIEF DESCRIPTION OF THE DRAWINGS

FIG. 3B is a block diagram of a memory architecture in accordance with another embodiment of this invention.

FIGS. 4A, 4B, 4C, and 4D illustrate the contents of a memory architecture in accordance with one embodiment of this invention.

DETAILED DESCRIPTION

According to the principles of this invention, certain limitations imposed by conventional data caches have been overcome. The present invention provides a parallel memory architecture, so that a stack-based computing system can easily access multiple portions of the stack. In one embodiment of the invention, the conventional stack of the stack-based computing system is divided into multiple stacks to provide simultaneous access to multiple frame components, such as the operand stack and the arguments and local variable area of the current method frame. In a second embodiment of the invention, multiple stack cache management units selectively cache portions of the stack so that multiple frame components such as the operand stack of the current method frame and the arguments and local variable area of the current method frame are cached. Another benefit for both embodiments is that no matter how large the first frame component, e.g., an operand stack, of the current method frame grows, the second frame components, e.g., an arguments and local variables area, of the current method frame remains at the top of a stack or a stack cache management unit for easy access by the stack-based computing system.

Figure 1:
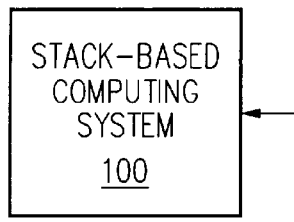
FIG. 1 is a block diagram of a stack-based computing system with a stack memory.
Figure 2:
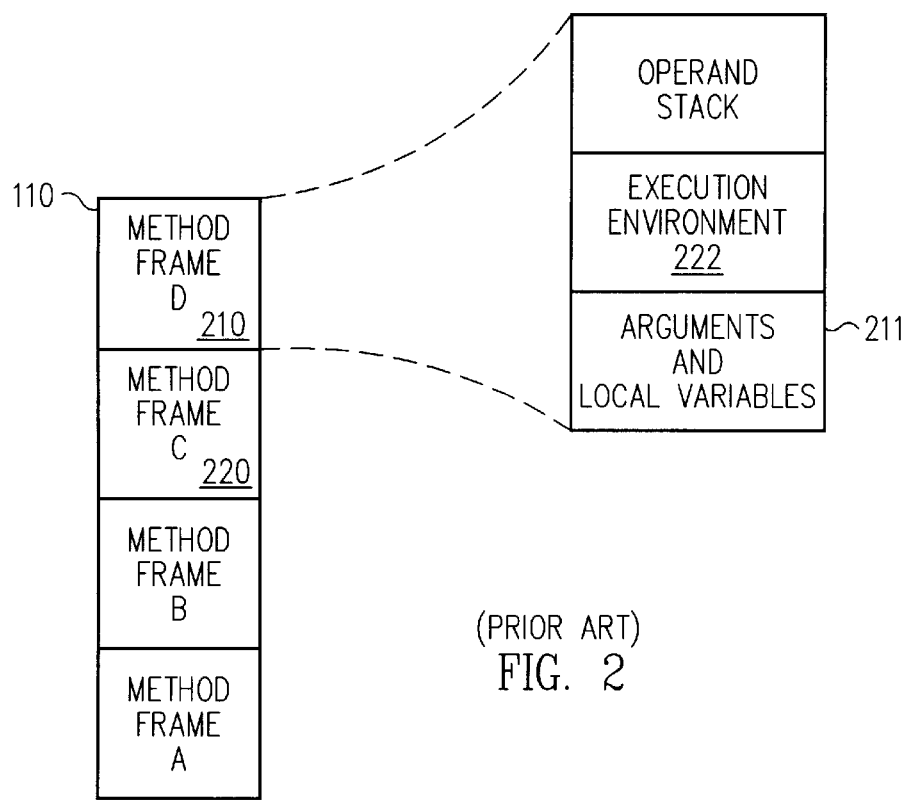
FIG. 2 illustrates the memory architecture of a stack-based computing system.
Figure 3A:
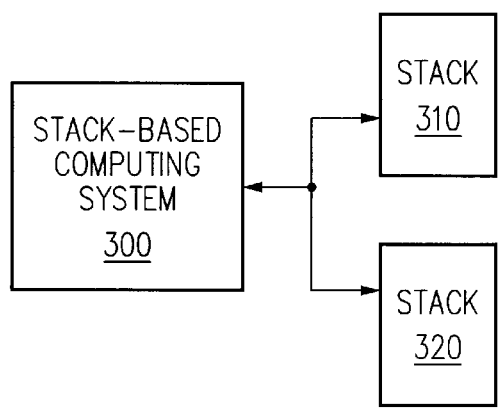
FIG. 3A is a block diagram of a memory architecture in accordance with one embodiment of this invention.

FIG. 3A illustrates a dual stack system in accordance with one embodiment of the invention. A stack-based computing system 300 is coupled to a first stack 310 and a second stack 320. As shown in FIG. 3B, the performance of stack 310 can be improved by incorporating a stack cache management unit 330 as described in U.S. patent application Ser. No. 08/787,736, entitled "METHODS AND APPARATUSES FOR STACK CACHING" or U.S. patent application Ser. No. 08/829,105, entitled "PIPELINED STACK CACHING METHOD." Similarly, the performance of stack 320 can be improved by using a stack cache management unit 340.

FIGS. 4A, 4B, 4C, and 4D show the arrangement of four method frames of four methods in stack-based computing system 300. For clarity the methods and method frames are named A, B, C and D. Each component of the method frame is labeled with the same letter (A–D) as the method and method frame.

Thus, method A is associated with method frame A, which contains operand stack A 444, execution environment A 446, and arguments and local variables area A 442. When method A is invoked, arguments and local variables area A 442 is pushed onto stack 320. Operand stack A 444 and execution environment A 446 are pushed onto stack 310. Thus, when method frame A is the current method frame, operand stack A 444 and arguments and local variable area A 442 are both at the top of a stack. Therefore, stack-based computing system 300 can easily access both operand stack A 444, as well as, arguments and local variables area A 442.

As explained above, if method A invokes method B, a portion of operand stack A 444 might be included in arguments and local variables area B 432. Therefore, arguments and local variables area B 432 (FIG. 4B) is stored at the top of stack 310. Consequently, operand stack B 434 and execution environment B 436 are stored at the top of stack 320, so that stack-based computing system 300 can easily access both operand stack B 434, as well as, arguments and local variables area B 432.

Figures 4C, 4D:
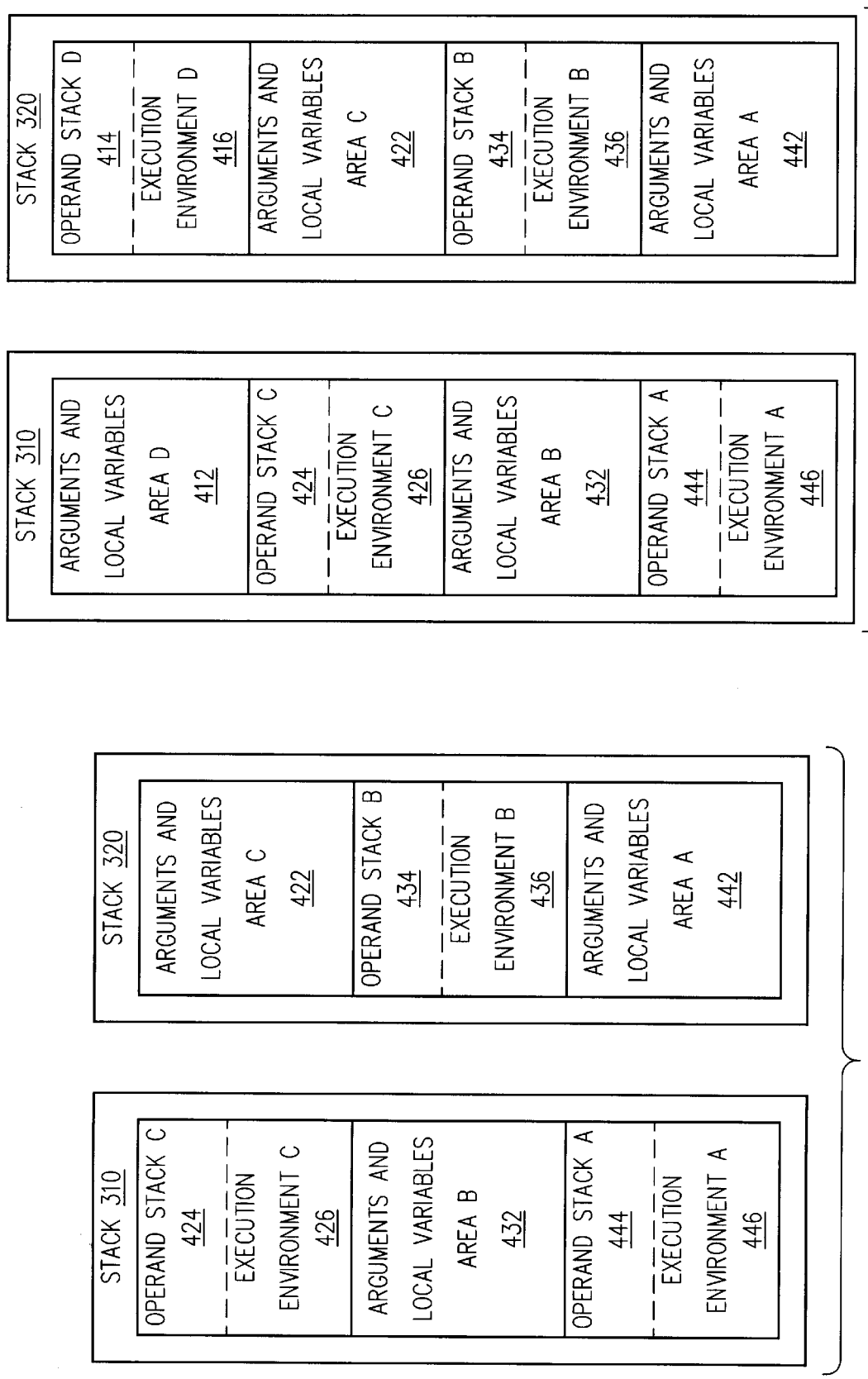

As shown in FIG. 4C, when method C is invoked, arguments and local variables area C 422 is stored at the top of stack 320 while operand stack C 424 and execution environment C 426 are stored at the top of stack 310. Conversely, as shown in FIG. 4D, when method D is invoked, arguments and local variables area D 412 is stored at the top of stack 310 while operand stack D 414 and execution environment D 415 are stored at the top of stack 320. Thus, the memory organization of FIGS. 4A, 4B, 4C, and 4D allows stack-based computing system 300 easy access to both the operand stack and the arguments and local variables area of the current method frame. Furthermore, no matter how large the operand stack of the current method frame grows, the arguments and local variables area of the current method frame remains at the top of a stack for easy access by stack-based computing system 300.

Thus, one dual stack embodiment of the present invention stores a first frame component of a first method frame in a first stack, a second frame component of the first method frame in a second stack. The first frame component of a second method frame is stored in the second stack while the second frame component of the second method frame is stored in the first stack. In the example of FIGS. 4A, 4B, 4C, and 4D, the operand stack and execution environment form the first frame component while the arguments and local variables area is the second component. However, other configurations are possible and fall within the scope of this invention. For example, in another embodiment the first frame component is the operand stack, while the second frame component is the arguments and local variable area as well as the execution environment.

Furthermore, in some embodiments of stack-based computing system 300, common variables between the operand stack of a preceding method and the arguments and local variables area of a succeeding stack are duplicated. For these embodiments, the frame components of each successive method frame can be stored in the same stack.

Figure 5:
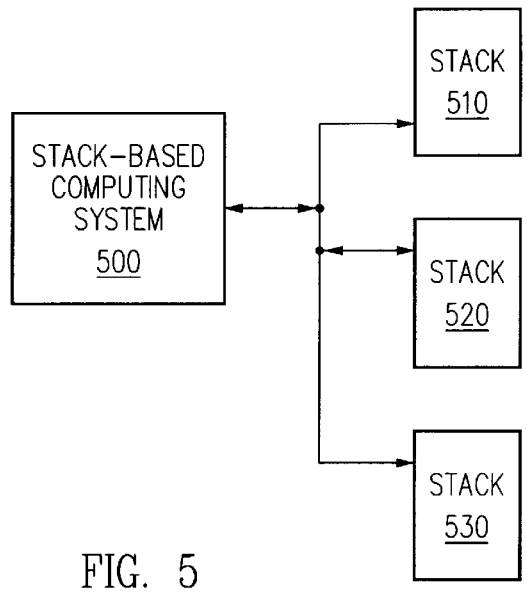
FIG. 5 is a block diagram of a memory architecture in accordance with one embodiment of this invention.

FIG. 5 shows a triple stack architecture in accordance with one embodiment of the present invention. Specifically, stack-based computing system 500 is coupled to a first stack 510, a second stack 520, and a third stack 530. In addition, a separate stack cache management unit can be coupled between stack-based computing system 500 and each of stacks 510, 520, or 530 to enhance the performance of the stacks.

FIGS. 6A, 6B, 6C, and 6D illustrate four method frames being stored in stack 510, stack 520 and stack 530 in accordance with one embodiment of the invention. For clarity, the various frame components in FIGS. 6A, 6B, 6C and 6D are labeled and numbered with the same names and reference numerals as in FIGS. 4A, 4B, 4C, and 4D.

Figure 6A:
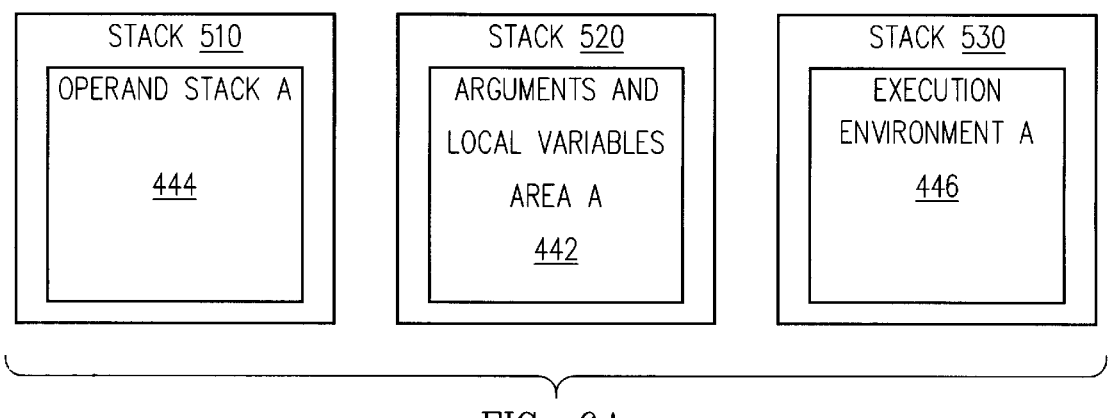
FIGS. 6A, 6B, 6C, and 6D illustrate the contents of a memory architecture in accordance with one embodiment of this invention.

FIG. 6A illustrates the contents of the stacks after invocation of method A. Stack 510 contains a first frame component, i.e. operand stack A 444; stack 520 contains a second frame component, i.e. arguments and local variables area A, 442; and stack 530 contains a third frame component, i.e. execution environment A 446. Since the three main frame components of method frame A, i.e. operand stack A 444, arguments and local variables area A 442, and execution environment A 446, are each at the top of a stack, stack-based computing system 500 can easily access important information from method frame A.

Figure 6B:
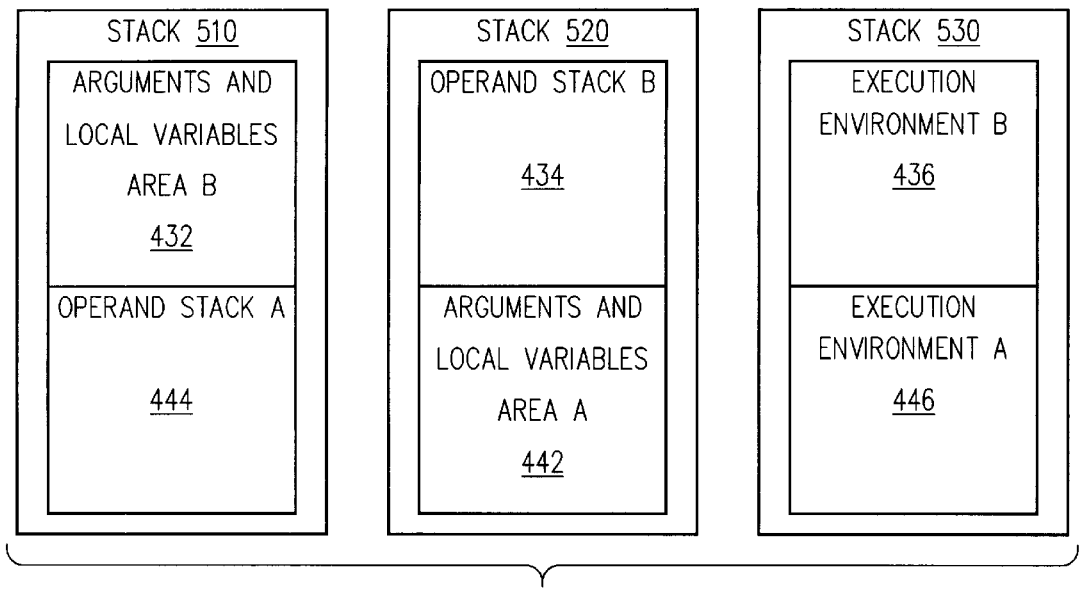
Figure 6C:
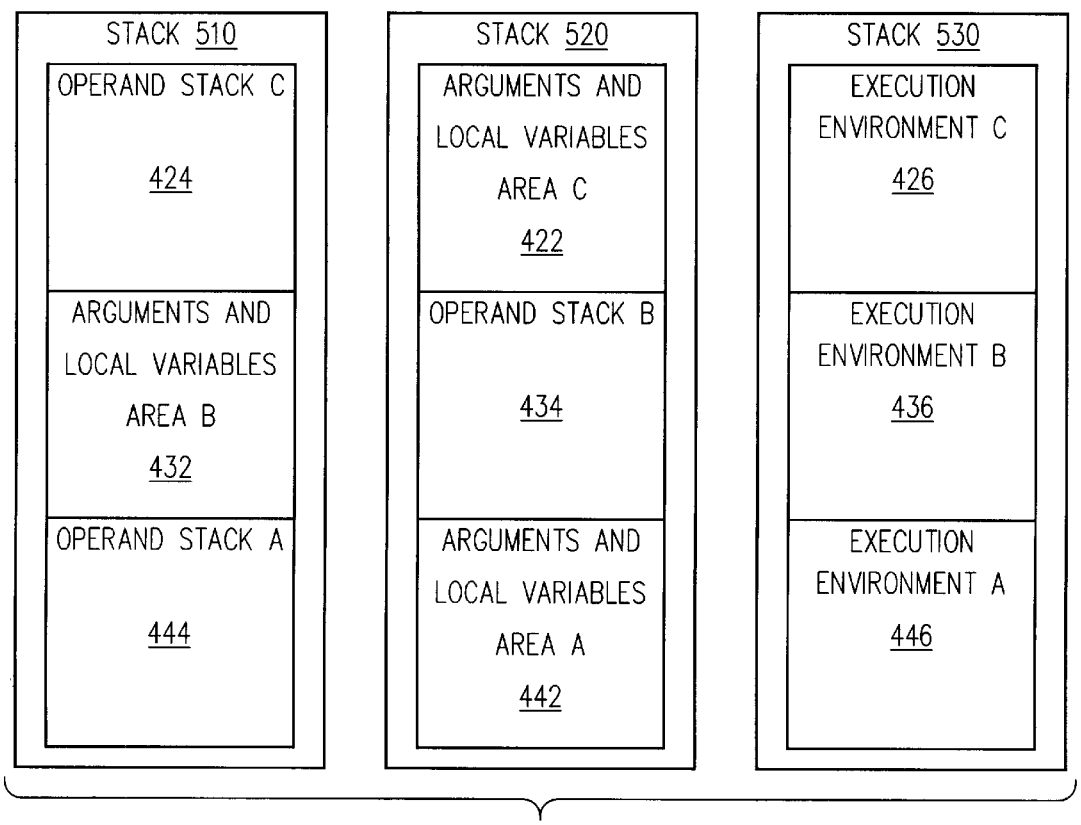
Figure 6D:
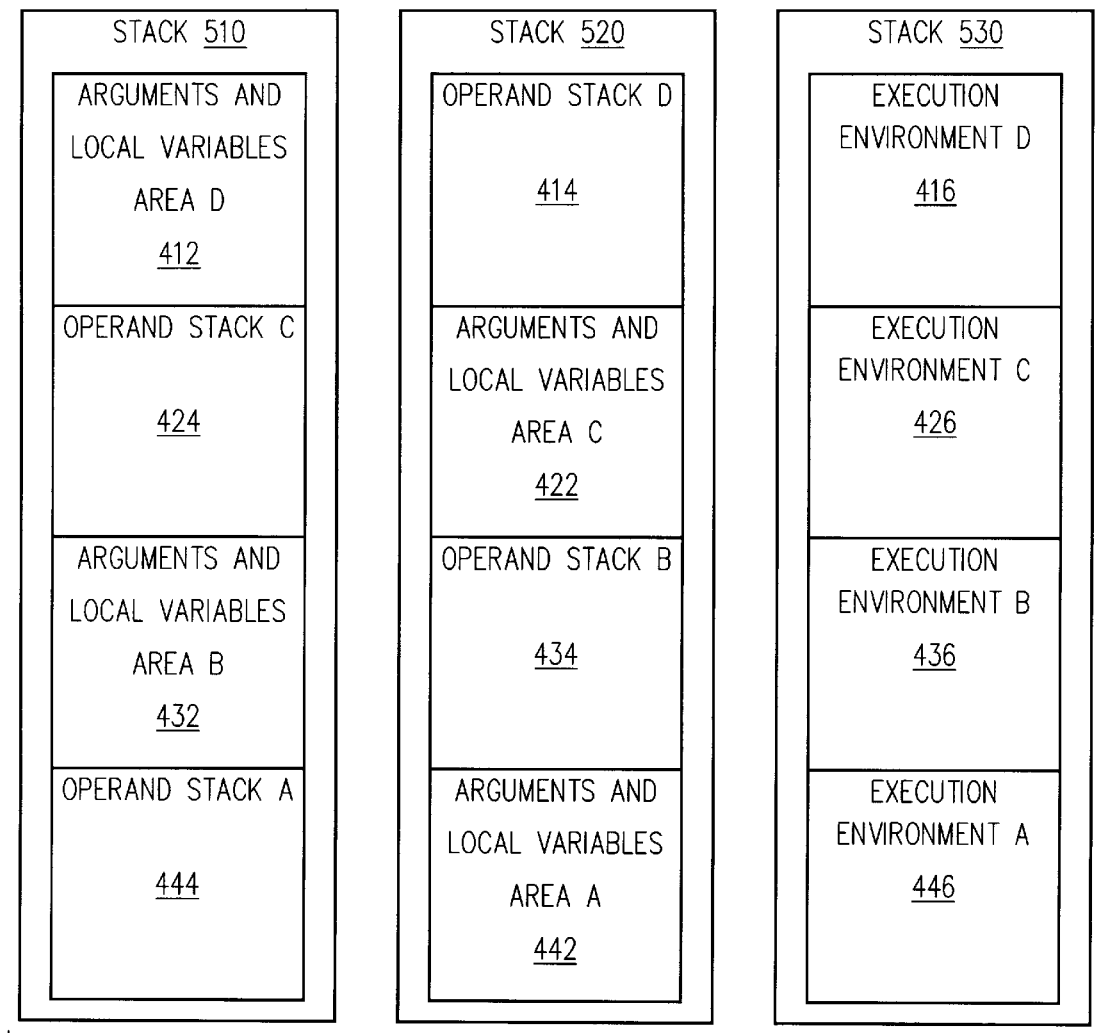

As explained above, a portion of operand stack A 444 might be included in arguments and local variables area B 432. Therefore, as shown in FIG. 6B, operand stack B 434 is placed above arguments and local variables area A 442 at the top of stack 520; arguments and local variables area B is placed at the top of stack 510; and execution environment B 436 is placed at the top of stack 530. Similarly, when method C is invoked, arguments and local variables area C 422 is placed above operand stack B 434 at the top of stack 520, as shown in FIG. 6C. Operand stack C 424 is placed at the top of stack 510 and execution environment C 426 is placed in stack 530. As shown in FIG. 6D, when method D is invoked, arguments and local variables area D 412 is placed above operand stack C 424 at the top of stack 510; operand stack D 414 is placed at the top of stack 510 and execution environment D 416 is placed in stack 530.

Thus, the memory organization of FIGS. 6A, 6B, 6C, and 6D allows stack-based computing system 500 easy access to the operand stack, the arguments and local variables area, and the execution environment of the current method frame. Furthermore, no matter how large operand stack of the current method frame grows, the arguments and local variables area of the current method frame remains at the top of a stack for easy access by stack-based computing system 500.

Another advantage of separating the various frame components of a method frame into different stacks is the ability to prioritize the caching of the various stacks in embodiments using stack cache management units, such as the embodiment of FIG. 3B. In general, the arguments and local variables area of the current method frame should receive priority in caching. However, if the stack cache management unit caching the operand stack of the current method frame is nearly empty, the caching of the operand stack should receive priority.

Figure 7:
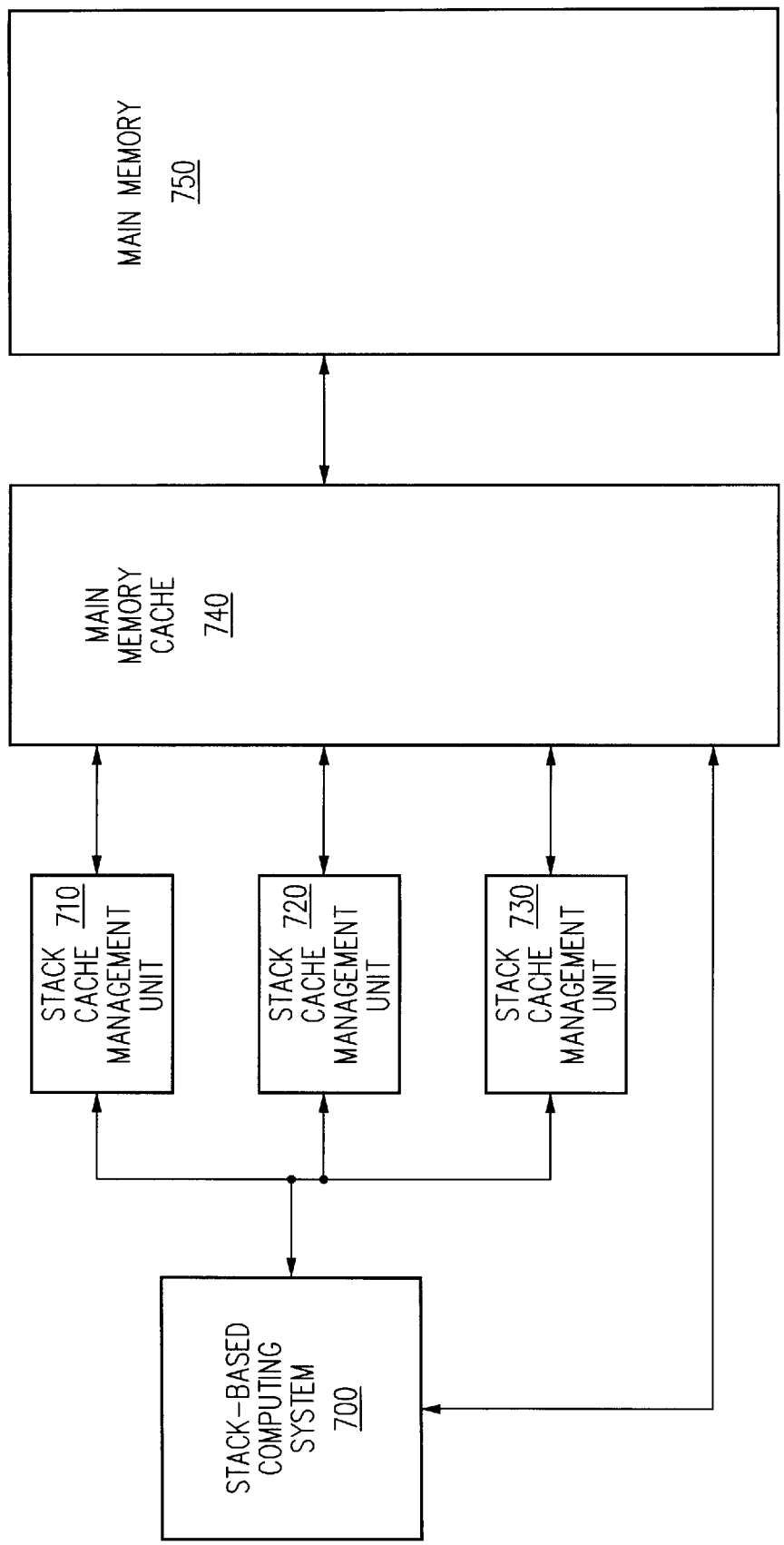
FIG. 7 is a block diagram of a memory architecture in accordance with one embodiment of this invention.

FIG. 7 shows a memory architecture in accordance with another embodiment of the invention. Instead of using multiple stacks, the memory architecture of FIG. 7 uses multiple stack cache management units to create multiple virtual stacks. Specifically, in FIG. 7, a stack-based computing system 700 is coupled to a stack cache management unit 710, a stack cache management unit 720, an optional stack cache management unit 730, and an optional main memory cache 740. Each of the stack cache management units is also coupled to main memory cache 740, which is coupled to main memory 750. If main memory cache 740 is not used, stack-based computing system 700, as well as, stack cache management units 710, 720 and 730 are coupled directly to main memory 750. Typically, main memory 750 has a random access memory architecture, therefore optional main memory cache 740 can be of conventional design. The stack cache management units can for example be those described in U.S. patent application Ser. No. 08/787,736, entitled "METHODS AND APPARATUSES FOR STACK CACHING" or U.S. patent application Ser. No. 08/829,105, entitled "PIPELINED STACK CACHING METHOD."

Figure 8A:
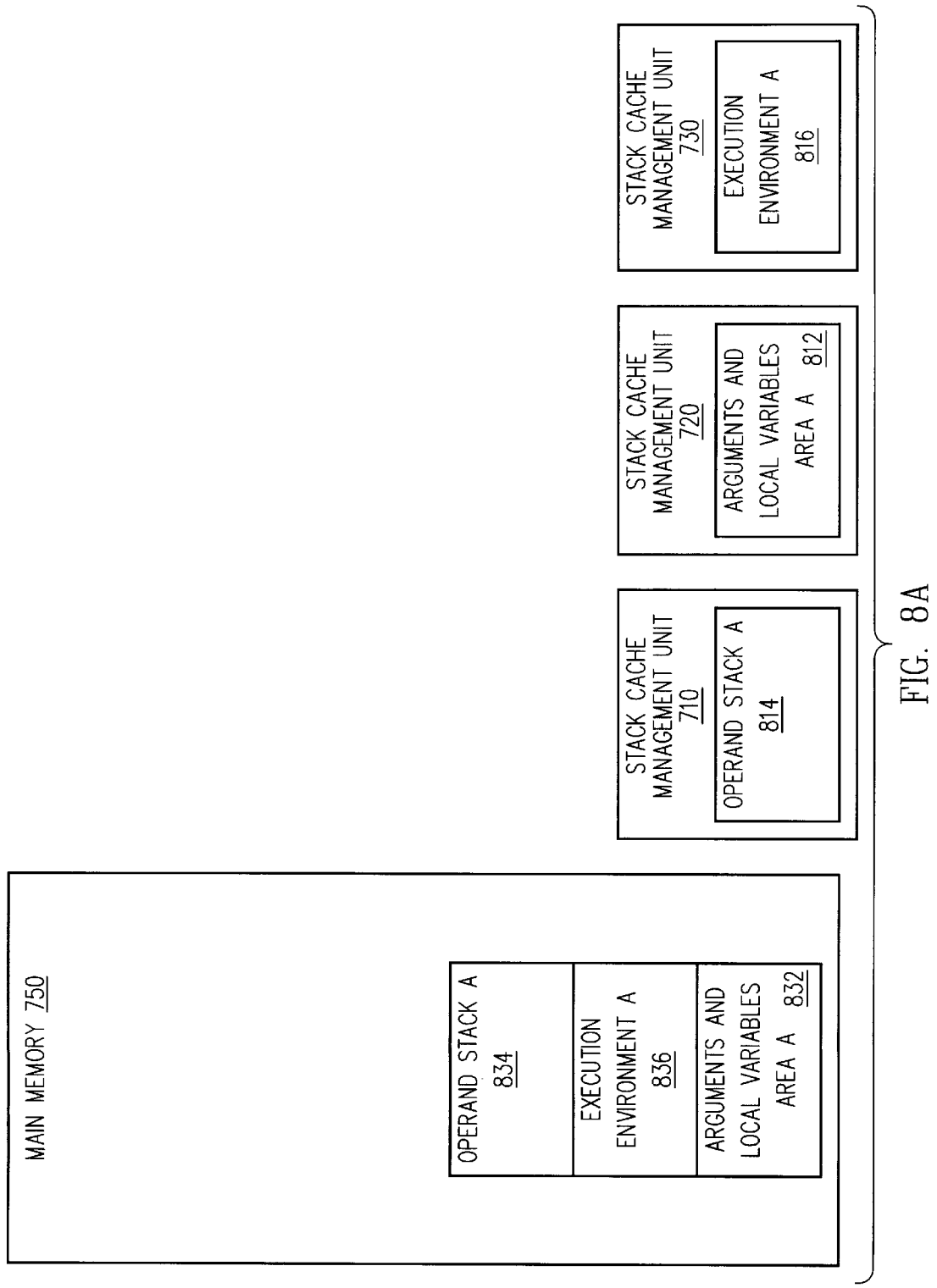
FIGS. 8A, and 8B illustrate the contents of a memory architecture in accordance with one embodiment of this invention.

FIG. 8A illustrates the contents of main memory 750 and stack cache management units 710, 720, and 730 after invocation of method A. For clarity, the following example does not include optional main memory cache 740 since memory caches for random access memories are well known in the art. Arguments and local variables area A 812 is cached in stack cache management unit 720. An associated memory area 832 in main memory 750 is allocated for arguments and local variables area A 812. Operand stack A 814 is cached in stack cache management unit 710. An associated memory area 834 in main memory 750 is allocated for operand stack A 814. As method A creates new operands, memory area 834 can be increased. If stack cache management unit 730 is used, execution environment A 816 is cached in stack cache management unit 730. Otherwise, execution environment A can be cached in stack cache management unit 710 under operand stack A 814. In either case, an associated memory area 836 is allocated in main memory 750 for execution environment A. Thus, stack-based computing system 700 can easily access operand stack A 814 in stack cache management unit 710, arguments and local variables area A 812 in stack cache management unit 720, and execution environment A 816 in stack cache management unit 730. Although not shown, other frame components of method frame A or method frame B might not be cached. The portions of method frame A and method frame B not cached are stored in main memory 850.

If the stack cache management units use a write through cache coherency policy, the data in the stack cache management units are duplicated in main memory 750. If the stack cache management units use a write back cache coherency policy the data in the stack cache management units are copied to main memory 750 only when the stack caches in the stack cache management unit are almost full. As operands are popped out of a stack cache management unit, the stack cache management unit fills the stack cache from the associated memory area of main memory 850 if more data is available.

Figure 8B:
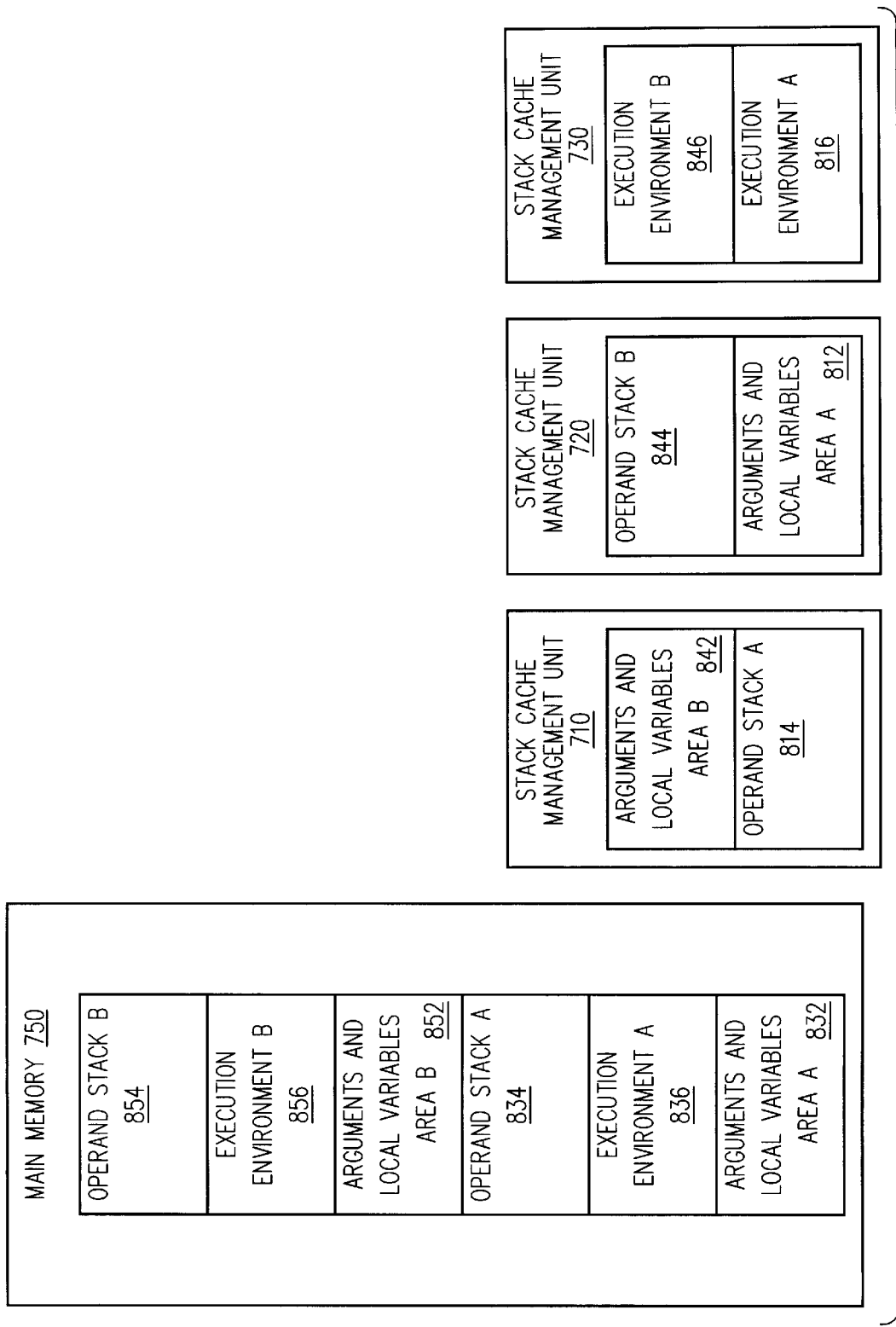

As shown in FIG. 8B, when method B is invoked, arguments and local variables 842 is cached in stack cache management unit 710 since a portion of operand stack A 814 might be included in arguments and local variables area B 842. In addition, an associated memory area in 852 is allocated in main memory 750 for arguments and local variables area B. Operand stack B 720 is cached in stack cache management unit 720 and execution environment B 846 is cached in stack cache management unit 730. Associated memory area 856 is allocated for execution environment B 846 and an associated memory area 854 is allocated for operand stack B 844. Thus, stack-based computing system 700 can easily access operand stack B 844 in stack cache management unit 720, arguments and local variables area B 842 in stack cache management unit 710, and execution environment B 846 in stack cache management unit 730.

If any frame component of method B overloads the capacity of one of the stack cache management units, the stack cache management spills portions of the frame components of method A to main memory 750 in the appropriate associated memory areas. For example, if method B increases operand stack B 844 so that the size of operand stack B 844 plus the size of arguments and local variables area A 812 is greater than the capacity of stack cache management unit 720, portions of arguments local variables area A 812 is copied to associated memory 832 and removed from stack cache management unit 720. If operands are popped off operand stack B 844, stack cache management unit 720 reloads data from associated memory area 854 or associated memory 832. Furthermore, when method B completes, the frame components of method frame B are removed from stack cache management units 710, 720, and 730. Stack cache management units 710, 720, and 730 then reload the portions of method frame A that were copied to main memory 750.

Another advantage of using multiple stack cache management units is the ability to prioritize the caching of the various stacks. Multiple stack cache management units may access main memory 750 simultaneously. A common occurrence to cause simultaneous requests to main memory 750 is completion of a method frame. In general, data requests from the stack cache management unit caching the arguments and local variables area of the current method frame should have the highest priority. However, if the stack cache management unit caching the operand stack of the current method frame is nearly empty, requests from the stack cache management unit caching the operand stack should have the highest priority.

In the various embodiments of this invention, methods and structures have been described that eliminate the problem of accessing multiple frame components of a method frame in a stack-based memory system. By using multiple stacks or multiple stack cache management units, important frame components at the top of a stack or a stack caches management unit. Thus the stack-based computing system can easily access multiple frame components regardless of the size of any one frame component.

The various embodiments of the structures and methods of this invention that are described above are illustrative only of the principles of this invention and are not intended to limit the scope of the invention to the particular embodiments described. In view of this disclosure, those skilled-in-the-art can define other stack cache management units, stack-based computing systems, frame components, method frames, execution environments, and use these alternative features to create a method, circuit, or system according to the principles of this invention.

We claim:

1. A memory circuit for storing a plurality of method frames, each of said method frames containing a plurality of frame components, said memory circuit comprising:

a first stack configured to store a first frame component of a first method frame, wherein said first method frame is included in said plurality of method frames, and a second frame component of a second method frame, wherein said second method frame also is included in said plurality of method frames, wherein said first frame component of said first method frame has a first characteristic with respect to said first method frame; and a second stack configured to store a second frame component of said first method frame and a first frame component of said second method frame, wherein said first frame component of said second method frame has a first characteristic with respect to said second method frame; and said first characteristic with respect to said first method frame and said first characteristic with respect to said second method frame are a same characteristic.

2. The memory circuit of claim 1 further comprising a first stack cache management unit coupled to said first stack.

3. The memory circuit of claim 2 further comprising a second stack cache management unit coupled to said second stack.

4. The memory circuit of claim 1 wherein said first stack is configured to store a third frame component of said first method frame.

5. The memory circuit of claim 4 wherein said second stack is configured to store a third frame component of said second method frame.

6. The memory circuit of claim 1 further comprising a third stack configured to store a third frame component of said first method frame and a third frame component of said second method frame.

7. The memory circuit of claim 6 further comprising a stack cache management unit coupled to said third stack.

\* \* \* \* \*